2,797,209
ZINC SULFIDE SUSPENSION STABILISERS IN STYRENE POLYMERIZATION

Henry Malcolm Hutchinson, Banstead, and Kenneth Stevens, Wallington, England, assignors to The Distillers Company Limited, Edinburgh, Scotland, a British company No Drawing. Application October 20, 1953, Serial No. 387,318

Claims priority, application Great Britain October 31, 1952

8 Claims. (Cl. 260—93.5)

The present invention relates to the polymerisation of styrene compounds by the suspension or "pearl" polymerisation procedure. By styrene compound is meant in this specification styrene and its derivatives obtained by substituting one or more of its nuclear hydrogen atoms with halogen atoms or with aliphatic groups containing not more than four carbon atoms. Examples of styrene compounds are the chlorostyrenes, the methyl styrenes, the dimethyl styrenes and the divinyl benzenes. The term polymerisation is used throughout the specification to include both the polymerisation of a single styrene compound to produce a homogeneous polymer and the copolymerisation of a styrene compound either with a different styrene compound or with another copolymerisable compound to produce a copolymer. Other monomeric compounds which will copolymerise with styrene compounds and in particular with styrene, are well known and as examples may be mentioned butadiene, alpha-methylstyrene, methyl methacrylate and acrylonitrile.

It is well known that if the polymerisation of styrene is effected with the monomer dispersed by agitation throughout an aqueous phase in the form of discrete globules, the resultant polymer is produced in the form of discrete particles or "pearls." In carrying out the above pearl polymerisation procedure it is essential to maintain the dispersion in a stable state both initially and while the polymerisation is taking place, i. e. the globules must not coagulate to form monomer particles of too large a size to give suitably sized polymer pearls, nor must the globules break up so as to form a stable emulsion from which the resultant polymer has to be recovered by precipitation. It is, therefore, customary to carry out the pearl polymerisation procedure in vessels suitably equipped with stirrers and the like which keep the monomer dispersed in the aqueous phase and emulsifying agents are not generally added since they may lead to an emulsified system.

In practice, it has also been found necessary to add suspension stabilizers to the agitated dispersion in order to maintain the polymerising monomer suitably dispersed throughout the aqueous phase. It has already been suggested that finely divided inorganic compounds such as kaolin, talc, barium, sulphate, kieselguhr, aluminium oxide may be used as suspension stabilizers. With the above inorganic stabilisers it is necessary to use relatively high proportions, i. e. at least 5% by weight on the monomeric material employed in order to form a stable dispersion and consequently a comparatively large amount of the inorganic material may become trapped during the polymerisation process in the polymer particles formed, thus affecting the physical properties of the final polymer.

The object of the present invention is to provide a new inorganic suspension stabiliser for use in the pearl polymerisation process as applied to styrene compounds. A further object is to provide a suspension stabiliser which is effective in concentrations below 5% by weight on the monomeric material initially present in the system.

It has now been found that finely divided zinc sulphide is a good suspension stabiliser for the pearl polymerisation of styrene compounds which is effective in relatively low concentrations.

According to the present invention the process for the pearl polymerisation of styrene compounds comprises polymerising monomeric material containing a styrene compound in aqueous suspension in the presence of finely divided zinc sulphide as suspension stabiliser.

The polymerisation is preferably brought about by heating the monomer suspension in the temperature range 60° C. to 160° C. Temperatures outside this range may be employed although the rate of polymerisation is rather slow below 60° C. for most styrene compounds. When temperatures near and above 100° C. are used to bring about the polymerisation reaction, it is necessary to employ superatmospheric pressures in order to keep the aqueous suspension in the liquid phase. For instance the boiling point of the styrene-water azeotrope is 92° C. at atmospheric pressure and consequently superatmospheric pressures have to be employed for the polymerisation of styrene by the process of the present invention at temperatures above this value.

The rate of polymerisation may be increased by the addition to the monomeric material containing the styrene compound of a polymerisation catalyst which is soluble therein. Such catalysts are well known in the art and as examples may be mentioned the organic peroxides such as benzoyl peroxide.

The pH value of the aqueous monomer suspension may be varied over a wide range, but it should not be made so acid or so alkaline as to cause the decomposition or inactivation of any of the reactants or components of the polymerisation reaction mixture. Generally, it is preferred to carry out the polymerisation in an aqueous suspension whose pH value is substantially neutral, i. e. in the range 5 to 9.

The finely divided zinc sulphide may be added to the water of the aqueous suspension either before or after the addition of the monomeric material containing the styrene compound thereto. Preferably the finely divided zinc sulphide is formed from an aqueous solution of a zinc salt and the resultant aqueous zinc sulphide suspension used as the aqueous phase in the pearl polymerisation.

The finely divided zinc sulphide may be prepared by any suitable means provided that the resultant particles are of the correct size to act as suspension stabilisers. Preferably the finely divided zinc sulphide is prepared by adding a soluble sulphide salt, for instance sodium sulphide, to a solution of a soluble zinc salt. Alternatively, the zinc sulphide may be produced by passing hydrogen sulphide gas into an aqueous solution of a soluble zinc salt.

The quantity of zinc sulphide suspension stabiliser present in the aqueous suspension may vary considerably, but it is expedient to employ as low a concentration thereof as possible so as to reduce to a minimum the amount of zinc sulphide which may become occluded in the formed polymer particles. The advantage of the process of the present invention is that concentrations of suspension stabiliser below 5% by weight on the monomeric material present are sufficient to stabilise the suspension. The preferred concentration is in the range 0.01 to 1% w./v. on the monomeric material initially present. By percent w./v. is meant the weight of stabiliser present measured in grams expressed as a percentage of the volume of the monomeric material present measured in millilitres.

The ratio of monomer to water can be varied considerably, but it is preferred to operate with a monomer: water ratio in the range 1:1 to 1:10 and generally a ratio of approximately 1:2 is used.

The particle size and quality of the polymer produced by the suspension or pearl polymerisation technique will depend on the various variable factors of the procedure such as, for instance, the degree of agitation of the dispersion, the monomer:water ratio, the temperature of the polymerisation, the concentration of the polymerisation catalyst employed and the quantity and size of the inorganic suspension stabiliser particles. It has now been discovered that the particle size and quality of the polymer produced according to the process of the present invention and in particular the stability of the monomer suspension may be controlled by the addition to the aqueous suspension of small quantities of surface-active or emulsifying agents. By surface-active or emulsifying agents we mean those organic compounds which when dissolved in water have the property of altering its surface tension. Such compounds possess an organophilic group associated with a hydrophilic group and particularly useful surface-active agents are the organic sulphates and sulphonates obtained by the sulphation or sulphonation of alcohols and hydrocarbons; alkali sulphite-addition products of neutral esters of unsaturated polycarboxylic acids; alkyl aromatic sulphonates and aryl alkyl polyether sulphonates such as are obtained by the sulphonation of the condensation products of ethylene oxide and alkyl phenols.

The presence of small quantities of a surface-active or emulsifying agent in the suspension being polymerised according to the process of the present invention may alter the size of the produced polymer particles and tends to increase the stability of the suspension especially when high temperatures are used.

Very small quantities of surface-active or emulsifying agents produce the above mentioned effects and it is essential that the amount of agent added should not be increased to such an extent that the emulsification of the water and styrene compound takes place with the formation of a true emulsion as distinct from a suspension in which the dispersed particles are kept suspended by agitation. Generally, the amount of agent added should not be more than 10% based on the weight of zinc sulphide used and amounts considerably below this quantity may give useful improvements to the suspension polymerisation process of the present invention.

The following examples illustrate the preparation and use as suspension stabiliser of zinc sulphide according to the process of the present invention.

Example 1

0.37 gram of sodium sulphide ($Na_2S.9H_2O$) dissolved in 150 ml. of water were added with stirring to 0.66 gram of zinc sulphate ($ZnSO_4.7H_2O$) in 150 ml. of water at 20° C. in a round 500 ml. flask. 150 ml. of styrene, containing 0.6 gram of benzoyl peroxide, were added to the resulting zinc sulphide suspension so that there was present 0.10% w./v. of zinc sulphide on the volume of styrene. The mixture was heated to 80° C. and maintained at this temperature, while stirring at high speed, until polymerisation was complete. The polymer was obtained in the form of beads of 0.003 to 0.06 inch in diameter.

Example 2

In Example 1 the pearl polymerisation of styrene in the presence of 0.10% w./v. of zinc sulphide on the styrene is shown. The example was repeated using the same quantities of styrene and water but in the presence of only 0.04% w./v. of zinc sulphide. The polystyrene was again obtained in the form of beads whose average diameter was slightly larger than that of the beads of Example 1.

Example 3

300 ml. of a 0.01% suspension of zinc sulphide were prepared by a method similar to that used in Example 1, except that 0.015 ml. of a commercial 20% by weight sodium alkyl sulphonate solution sold under the trade name "Teepol" was added. 150 ml. of styrene containing 0.6 gram of benzoyl peroxide, were added and the mixture stirred in an atmosphere of nitrogen at 80° C. until polymerisation was complete. Polystyrene beads of excellent clarity were produced. A similar process in which the surface active agent was omitted gave similar polystyrene beads whose average size was slightly increased.

The following table shows the results of sieve anaylses on the beads produced in the two cases. The figures represent the percentage of beads whose diameters fall within the specified range.

| Bead sizes in inches | 3/16–1/8 | 1/8–1/16 | 1/16–1/32 | 1/32–1/64 |
|---|---|---|---|---|
| "Teepol" present | | 47 | 52 | 1 |
| No "Teepol" present | 35 | 59 | 6 | |

Example 4

600 ml. of a 0.11% w./v. zinc sulphide suspension, together with 300 ml. of styrene, were charged into a stainless steel pressure vessel, equipped with a high-speed agitator, and the mixture was maintained at 140° C., stirring meanwhile, until the styrene had polymerised. The polymer was obtained in the form of beads approximately 0.01 to 0.06 inch in diameter.

Example 5

A solution of 336 grams of sodium sulphide
($Na_2S.9H_2O$)
in ½ gallon of water was added to a stirred solution of 604 grams of zinc sulphate ($ZnSO_4.7H_2O$) in 4½ gallons of water in a stainless steel pressure vessel. 27 lbs. styrene monomer were then added, followed by 5.45 ml. commercial "Teepol" solution. The stirred suspension was heated by injection of live steam to 140° C. for 5 hours, followed by 7 hours at 150° C., and the product was steam-stripped to remove residual volatile material. Polystyrene was obtained in the form of spherical beads of uniform size having the following diameters:

| Bead sizes in inches | >1/16 | 1/16–1/32 | 1/32–1/16 | <1/64 |
|---|---|---|---|---|
| Percent by weight | 0.5 | 95.2 | 3.9 | 0.4 |

Example 6

0.37 gram of sodium sulphide ($Na_2S.9H_2O$) dissolved in 150 ml. water was added to a stirred solution of 0.487 gram of zinc sulphate ($ZnSO_4.7H_2O$) in 150 ml. water. 150 ml. of a monomer mixture containing 116.25 ml. styrene and 33.75 ml. divinyl benzene/ethyl vinyl benzene mixture (140% unsaturation) and containing 0.3 gram of benzoyl peroxide, were added. The mixture was stirred at high speed in a 500 cc. flask and polymerised at 80° C. The resulting copolymer was obtained in the form of spherical beads having the following diameters:

| Sieve aperture (inches) | >0.25 | 0.188 | 0.125 | 0.063 | 0.031 | 0.016 | 0.008 | 0.006 | 0.005 |
|---|---|---|---|---|---|---|---|---|---|
| Percent by weight retained | 0.8 | 0.1 | 0.6 | 1.3 | 2.3 | 4.3 | 88.2 | 1.2 | 1.2 |

Example 7

300 ml. of a suspension of zinc sulphide were prepared as described in Example 6, and 150 mls. parachlorstyrene monomer, containing 0.3 gram of benzoyl peroxide, were suspended therein. The stirred suspension was polymerised at 80° C. to give spherical polymer beads of the following sizes:

| Sieve aperture (inches) | 0.031 | 0.016 | 0.008 | 0.006 | 0.005 |
|---|---|---|---|---|---|
| Percent by weight retained | 6.2 | 28.9 | 64.1 | 0.7 | 0.1 |

Example 8

150 mls. of an aqueous solution containing 0.1176 gram sodium sulphide ($Na_2S$) were added to a stirred solution of 0.40 gram zinc sulphate ($ZnSO_4.7H_2O$) in 150 mls. water. 150 mls. of styrene monomer, containing 0.6 gram benzoyl peroxide, were added and the suspension was polymerised at 80° C. under nitrogen. Polystyrene beads, approximately ⅛ in. diameter, were obtained.

We claim:

1. A process for the pearl polymerisation of styrenes which comprises polymerising monomeric material containing a compound of the formula

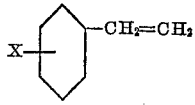

wherein X is a member selected from the group consisting of H, Cl, alkyl with not more than 4 carbon atoms, and vinyl in aqueous suspension in the presence of finely divided zinc sulphide as suspension stabiliser.

2. A process as claimed in claim 1, wherein the polymerisation is carried out in the presence of a polymerisation catalyst which is soluble in the said monomeric material.

3. A process as claimed in claim 1, wherein the pH of the aqueous suspension lies in the range 5 to 9.

4. A process as claimed in claim 1, wherein the monomer:water ratio lies in the range 1:1 to 1:10.

5. A process as claimed in claim 1, wherein the quantity of zinc sulphide stabiliser present lies in the range 0.01 to 1% w./v. on the monomeric material initially present.

6. A process as claimed in claim 1, wherein the aqueous suspension contains a small quantity of a surface active agent, said quantity not being sufficient to cause emulsification of the suspension.

7. A process as claimed in claim 1, wherein the monomeric material contains styrene.

8. A process for the pearl polymerisation of styrene, which comprises polymerising monomeric material consisting solely of styrene in aqueous suspension in the presence of finely divided zinc sulphide as suspension stabiliser.

References Cited in the file of this patent

UNITED STATES PATENTS 2,524,627    Hohenstein    Oct. 3, 1950

OTHER REFERENCES

Burk et al.: "High Molecular Weight Organic Compounds," pages 10–13, Interscience (1949).